A. J. POSTANS.
INDICATOR FOR CASH REGISTERS.
APPLICATION FILED AUG. 27, 1907.
942,348.
Patented Dec. 7, 1909.
4 SHEETS—SHEET 2.
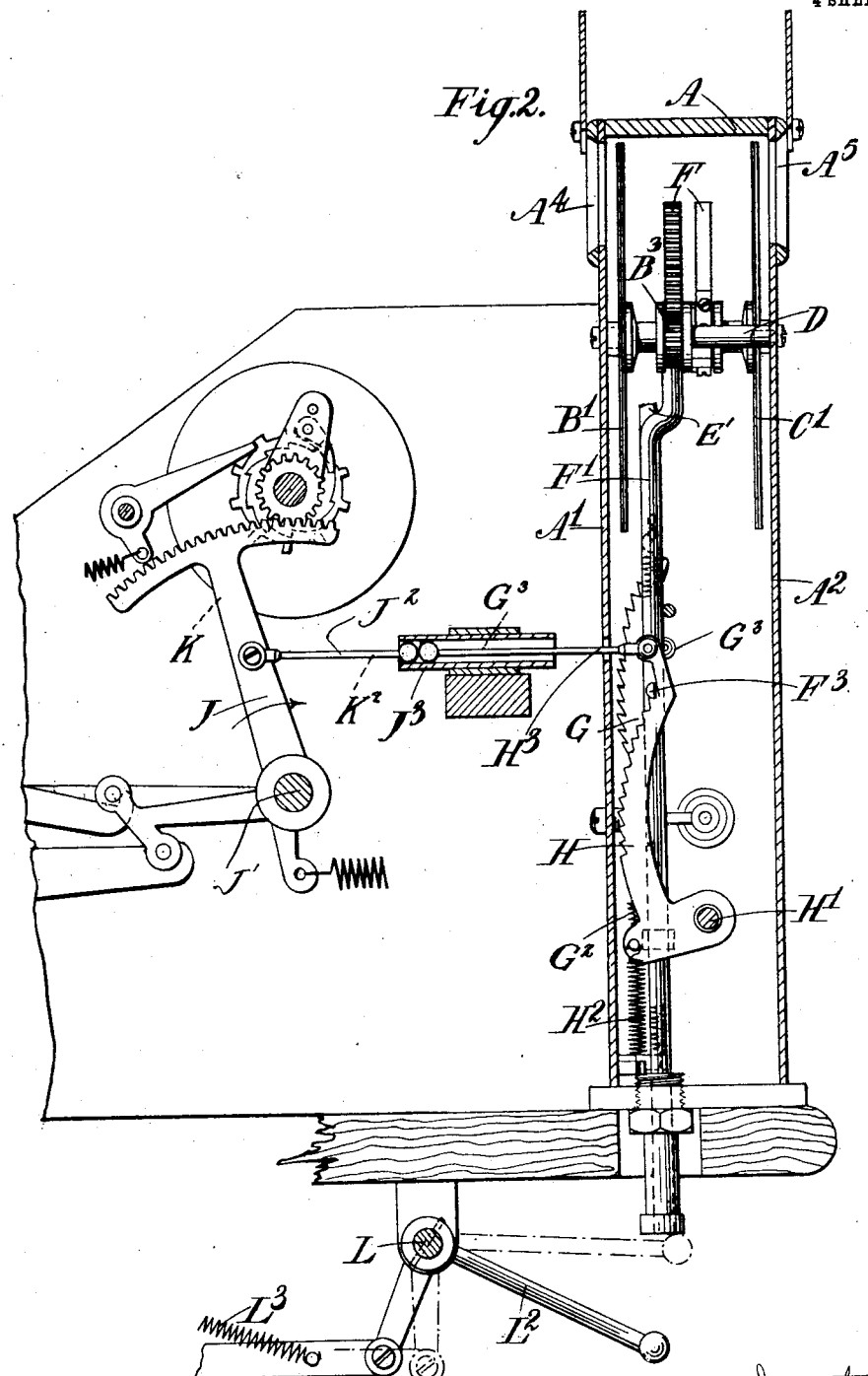

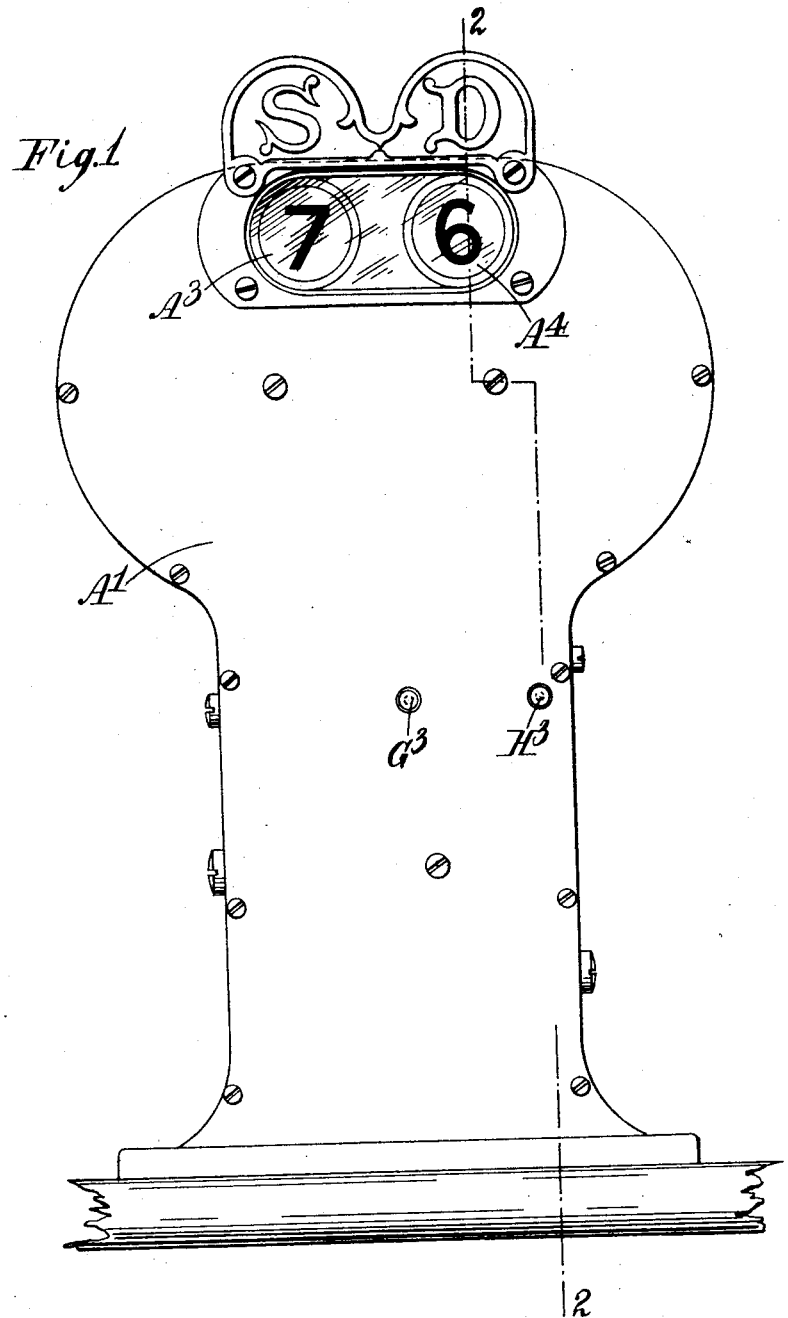

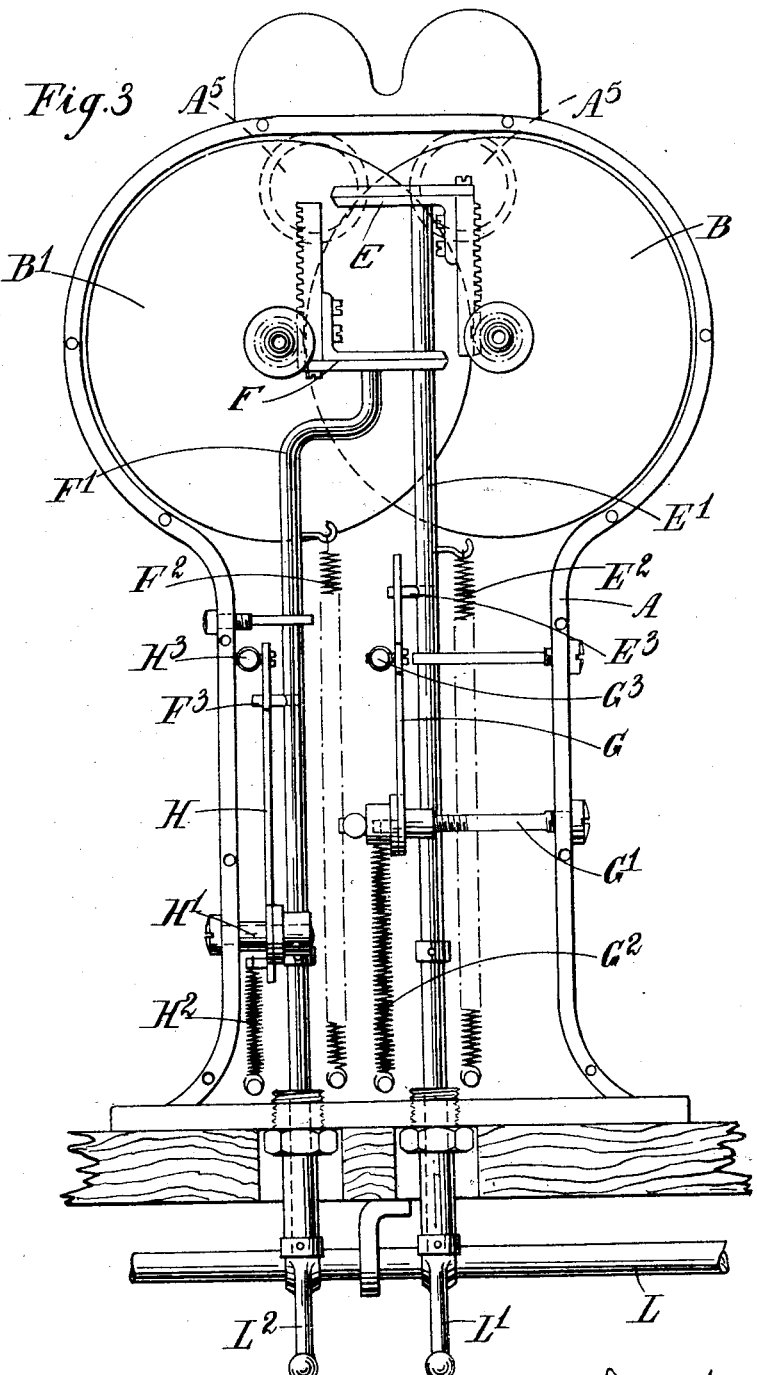

A. J. POSTANS.
INDICATOR FOR CASH REGISTERS.
APPLICATION FILED AUG. 27, 1907.
942,348.
Patented Dec. 7, 1909.
4 SHEETS—SHEET 4.
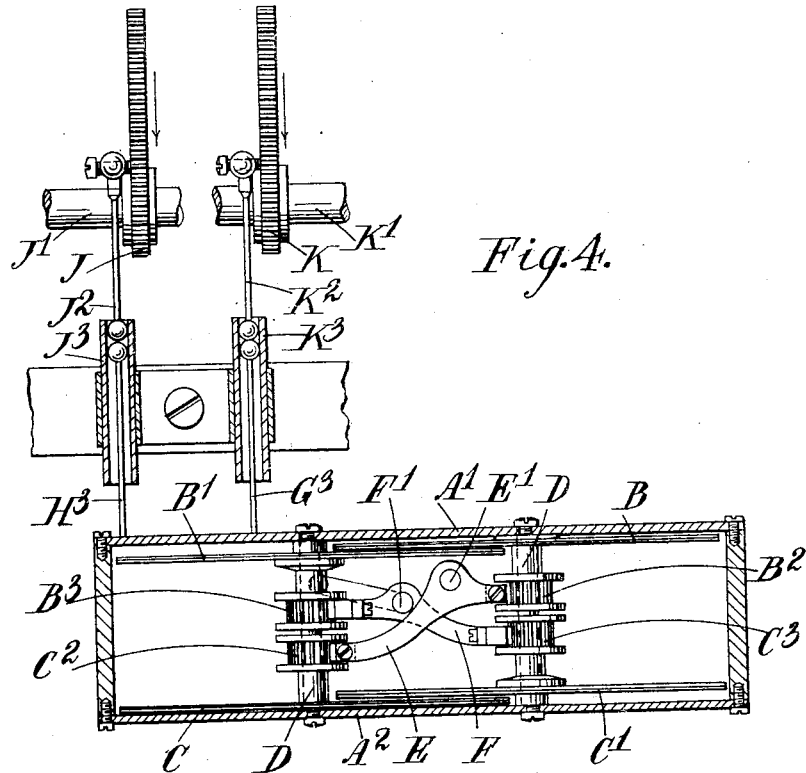
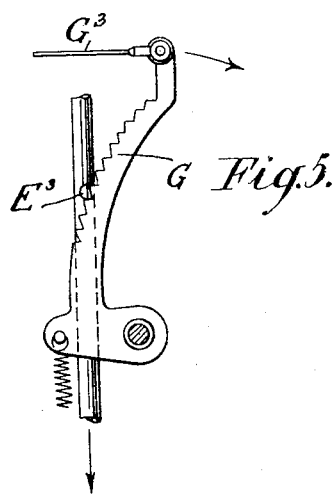

UNITED STATES PATENT OFFICE.

ARTHUR JAMES POSTANS, OF LONDON, ENGLAND, ASSIGNOR TO ADDER CASH REGISTER SYNDICATE LIMITED, OF LONDON, ENGLAND.

INDICATOR FOR CASH-REGISTERS.

942,348.   Specification of Letters Patent.   Patented Dec. 7, 1909.

Application filed August 27, 1907. Serial No. 390,336.

*To all whom it may concern:*

Be it known that I, ARTHUR JAMES POSTANS, a subject of the King of England, and residing at London, in England, have invented certain new and useful Improvements in Indicators for Cash-Registers, of which the following is a specification.

This invention is for improvements in or relating to indicator mechanism for calculating machines and the like, and has for its object to provide a simple mechanism whereby the separate items may be visibly indicated as they are registered upon the machine.

Cash registers and other machines are, as is well-known, provided with indicating devices whereby the amount of the purchase is indicated so that the purchaser can see that the correct amount has been registered by the salesman, and the present invention refers only to the mechanism for thus visibly indicating any particular item registered by the machine, the mechanism being adapted for application to any machine wherein one or more of the members employed is always advanced proportionally to the amount registered at each separate operation of the machine. In the form of calculating machine described in my earlier patent No. 786839 dated 11th April 1905, this member would be the quadrant whereby the movement of the keys is transmitted to the registering drums. The actual indicating plates employed heretofore have usually taken the form of number tablets adapted to be separately raised according to the amount to be indicated, but it is preferred for the purposes of this invention to rely mainly upon the use of disks carrying a series of numbers and adapted to be rotated until the correct number appears opposite one or more openings; tablets may however be employed also.

Broadly this invention consists in the employment of a cam-shaped, or a stepped member, such as a rack, and a stop or follower coöperating therewith, one of these members being connected with a sign device and loaded to maintain it in contact with the other either of which is movable to cause different portions of the stepped or cam-surface to coöperate with the stop or follower according to the item to be indicated. The operating member of the cash register or like machine effects the required displacement of that member whose movement causes different portions of the stepped or cam-surface to come into operation. Preferably a rack is employed as the stepped member and a detent member is used as a follower the rack being pivoted, and moved by the operating member of the cash-register so that the detent is displaced from the zero position (namely the first tooth of the rack) and is advanced by its loading to engage a tooth of the rack at a greater or less distance from the zero position according to the amount of displacement given. The indicator mechanism does not return with the operating member of the cash register as it is required that the indicator shall show the item registered after the operating member has returned to its normal position. Preferably the detent member takes the form of a rod adapted to slide vertically and carrying a detent pin for engagement with the rack, which for the purpose of distinction may be called the computing rack. This rack has a curved or cam-shaped operating face and is pivoted at its base so that it can swing away from or toward the detent pin. The detent member is loaded conveniently by a spring (or its own weight may be relied upon), and has secured to it an indicator rack which engages the pinion of a disk carrying the numbers which are presented at a suitable orifice in the casing according to the amount registered. The computing rack is preferably spring-controlled whereby its engagement with the detent is insured and normally the detent rests upon the upper end of the rack.

The operating member of the calculating machine carries a pushrod or equivalent device which is adapted to butt against the computing rack, or a part secured thereto, so that as the operating member advances the rack will be pushed back away from the detent. As the rack is thus moved away from the detent the latter will fall step-by-step down the toothed cam-face, and, when the forward motion ceases, the detent will rest upon that tooth with which it has last come into contact. The falling step-by-step is more or less theoretical as the movement of the rack would usually be so rapid that the detent would fall direct on to the tooth upon which it is to rest. It will be seen that the amount to be indicated by the disk is thus computed by the degree of displacement given to the rack as the numbers on the disk correspond with the teeth of the rack so that, if the detent falls from the zero position on to the first tooth, 1 will be indicated by the disk, or, if it drops to the second tooth, 2 will be indicated and so on.

In the accompanying drawings which illustrate one method of carrying out this invention, Figure 1 is a front elevation of the indicator, Fig. 2 is a vertical section through the indicator on the line 2—2 of Fig. 1, parts being omitted for the sake of clearness; Fig. 3 is a rear view of the indicator with the back plate of the casing removed and one element of each of the double racks omitted for the sake of clearness; Fig. 4 is a plan of the mechanism in the upper portion of the casing together with those parts which lie outside of the casing, and Fig. 5 shows part of the mechanism in Fig. 2 in a different position.

Like letters indicate like parts throughout the drawings.

The indicator is intended for coöperation with a cash register or other calculating machine, and that shown in the drawings is arranged to indicate the separate items, registered by the machine, in shillings and pence. The whole of the mechanism is inclosed in a casing comprising a frame $A$ whereto front and back plates $A^1$ $A^2$ respectively are secured. When in place upon the register the plate $A^1$ is toward the operator and the amount is indicated in the glazed openings $A^3$ $A^4$ provided in the front plate $A^1$. The back plate $A^2$ also has glazed openings $A^5$ corresponding to $A^3$ $A^4$ so that the amount indicated at the front of the apparatus may be simultaneously indicated at the rear in order that the purchaser may see that the correct amount has been registered.

The indicator plates take the form of disks $B$ $B^1$ and $C$ $C^1$ respectively. These disks are pivoted free upon spindles $D$ carried by the plates $A^1$ $A^2$ and on each plate is a series of figures disposed in a circle about the center of the disk so that any one of the figures may be brought to register with the openings in the plates according to the amount to be indicated. Each disk is carried by a sleeve whereon is a pinion, the disks $B$ and $C$ having pinions $B^2$ $C^2$. These two pinions are connected together by a double rack $E$ (shown in plan in Fig. 4 and in elevation with one element broken away for the sake of clearness in Fig. 3) carried by a vertical rod $E^1$ so that movement of the rack in either direction results in corresponding movement of these two disks; the double rack $E$ is broken away from the rod $E^1$ in Fig. 2, and the disks $B$ and $C$ operated thereby, are also omitted from this figure for the sake of clearness. Similarly, the disks $B^1$ $C^1$ have pinions $B^3$ $C^3$ which are connected together by a double rack $F$ carried by a vertical rod $F^1$. The rack $E$ thus controls the disks $B$ and $C$ which indicate the shillings, and the rack $F$ controls the disks $B^1$ $C^1$ whereby the pence are indicated. In Fig. 2 the rack $E$ and disks $B$ and $C$ with their pinions are omitted for the sake of clearness and in Fig. 3 the disks $C$ and $C^1$ with their respective half-rack portions are omitted for the same reason.

The indicator rack-rods $E^1$ $F^1$ are loaded by springs $E^2$ $F^2$ so that they tend to descend and rotate the disks to the full limit of their movement, but this is prevented by computing racks allotted one to each of the rods and pivoted within the casing below the disks. The computing rack $G$ (see Figs. 2, 3 and 5) controls the rod $E^1$ and is pivotally carried on a pin $G^1$ mounted in the casing while the rack $H$ controls the rod $F^1$ and is similarly pivoted on a pin $H^1$. The rods $E^1$ $F^1$ carry detents $E^3$ $F^3$ respectively, which engage the teeth of the corresponding computing racks and thus retain each rod in its raised position. The racks $G$ and $H$ are controlled by springs $G^2$ $H^2$ whereby they are automatically returned to their normal position when zeroizing as hereinafter described.

To operate the racks $G$ and $H$ push-rods $G^3$ $H^3$ are provided, one rod being pivoted to the free end of each rack. These rods extend through orifices in the front plate $A^1$ and enter the rear of the cash register. The register is not shown in the drawings as it may take any suitable form provided it has in it one or more key operated members which are always advanced proportionally to the amount registered at each separate operation of the machine. In the drawings toothed quadrants $J$ and $K$ are shown as representing these key operated members. The members themselves form no part of the present invention, but serve to move the usual registering mechanism wherewith cash registers are provided. The quadrant $J$ is pivoted to $J^1$ and has pivoted to it a push-rod $J^2$. The rod $J^2$ enters a tubular guide $J^3$ mounted within the cash-register and the indicator is alined with the register so that the push-rod $H^3$ of the rack $H$ may also enter the tubular guide $J$ but from the end remote from the quadrant $J$ and may lie with its end in contact with that of the rod $J^2$. The quadrant $J$ represents the member in the cash register which is always moved proportionally with the number of pence to be registered and this is therefore employed to operate the computing rack $H$ which controls the pence sign devices $B^1$ $C^1$ but the computing rack $G$ is operated by another quadrant $K$ pivoted at $K^1$ and moved in proportion to the number of shillings to be registered. The push-rod $G^3$ enters a guide $K^3$ similar to the guide J³ and coöperates with a push-rod K² on the quadrant K.

The operation of the indicator is as follows: When registering an amount on the cash-register, the quadrants J and K move in the direction indicated by the arrows (Figs. 2 and 4), but immediately the amount has been registered they fall back to the normal position shown in the figures. Supposing the quadrant J to be thus advanced, its rod J² pushes the rod H³ before it and swings the rack H about its pivot H¹ against the operation of the spring H². This frees the detent F³ so that rod F¹ with the double indicator-rack F drops under the action of the spring F² until again arrested by a tooth farther down the rack H. The number of teeth over which the detent F³ will pass before it is arrested depends upon the amount of displacement given to the rack and this is always proportional to the movement of the quadrant J and consequently it is also proportional to the amount registered on the machine. If therefore eight pence is to be registered on the cash register, the quadrant J will be advanced proportionally and the computing rack H will be swung back thereby a distance such that the detent F³ will descend from the first tooth to the ninth tooth thereon; the rack G and detent E³ are shown thus displaced in Fig. 5. When resting upon the first tooth the double rack F held the indicator plates or sign devices B¹ C¹ in such position that a cipher or a blank appeared at the glazed orifices on both sides of the apparatus, but as the rod F¹ descends, it causes the double rack to rotate the pinions B³ C³ so that both disks are carried around a distance proportional to the degree of movement of the rod F¹, that is, of the detent F³. The numbers on the disks are so arranged that for every tooth the detent passes over, a fresh number will appear at the indicating orifices. It follows therefore that the plates instead of indicating naught will register eight on both sides of the apparatus if the detent is allowed to drop on to the ninth tooth of the rack as shown. The shillings rack E and rod E¹ is operated in precisely the same manner by the quadrant K and it will be seen that the shillings and pence appear in proper order side by side on both sides of the apparatus simultaneously. After the amount has been registered on the cash register, the racks J K automatically return to their normal positions but this does not affect the indicator apparatus as there is no positive connection between the push-rods on the quadrants and those on the computing racks, and it is desired that the amount shall remain registered therein until the change has been given to the purchaser and the whole transaction completed.

To zeroize the indicator, a rocking shaft L is employed carrying arms L¹ L². The arms L¹ L² lie vertically beneath the rack-rods E¹ F¹ and are normally held clear of the rack-rods by a spring L³ which controls the rocking shaft. Any suitable means may be provided for operating the rocking shaft, such as a hand lever, and when the shaft is turned the levers L¹ L² are brought into contact with the lower ends of the rack-rods E¹ F¹ so that they are raised against the action of their springs E² F² until the detents E³ F³ are brought once more to their normal positions. As the computing racks G and H are spring-controlled, they will follow the movement of the detents so that as these latter reach their normal positions, the top tooth of each rack will be brought beneath its respective detent and retain the same in the zero position. The rocking shaft L is then released and under the action of the spring L³ again returns to its position of rest with the levers L¹ L² clear of the rack-rods.

It should be noted that the axis about which the racks G and H pivot lie to one side of the direction of thrust put upon the rack by the detents E³ F³ so that when either detent engages a tooth on the rack it tends to draw the rack forward against the detent and thus insures engagement with the tooth. The faces of the racks are curved although obviously a similar result can be obtained by a straight rack if desired. The straight rack may be pivoted about an axis which would intersect the vertical line occupied by the detent, so that directly the rack was displaced from the vertical position it would present an inclined face to the detent whereupon the latter would drop from the zero position on to one or other of the teeth according to the amount of inclination given, as will be readily understood.

What I claim as my invention and desire to secure by Letters Patent is:—

1. In an item indicator for a cash register the combination of, a movable sign device, a member operatively connected therewith, a loading for that member that always tends to advance it and the sign device, a computing member that has a cam-shaped face which engages some part whereby the advance of the loaded member under the action of its loading is arrested, and means for effecting relative displacement of the computing member and such engaging part in such direction as to bring a fresh portion of the cam-shaped face into operation the degree of displacement varying according to the amount to be registered, substantially as set forth.

2. In an item indicator for a cash register the combination of, a movable sign device, a member operatively connected therewith, a loading for that member that always tends to advance it and the sign device, a computing member that has a cam-shaped face whereon a part carried by the loaded member bears and whereby the advance of the loaded member under the action of its loading is arrested and means for displacing the computing member in such direction that a portion of the cam-shaped face more remote from the engaging part of the loaded member is brought opposite such part the degree of displacement varying according to the amount to be registered, substantially as set forth.

3. In an item indicator for a cash register the combination of, a movable sign device, a member operatively connected therewith, a loading for the member that always tends to advance it in a given path, such movement also advancing the sign-device, a toothed rack whose teeth lie approximately in the line of travel of a portion of this loaded member the teeth being engaged by such portion under the action of the loading, a pivotal support for the toothed rack whereby the rack is carried in such manner that that end of it toward which the engaging portion of the loaded member advances always lies in the path of the engaging portion, and means for swinging the rack about the pivot so that that end nearest the engaging portion of the loaded member will be carried away from such portion a distance varying according to the amount to be registered, substantially as set forth.

4. In an item indicator for a cash register the combination of, a movable sign device, a loaded member that is operatively connected with the sign device and always tends to advance in a given path under the action of its loading, a toothed rack whose teeth lie approximately in the line of travel of a portion of this loaded member the teeth being engaged by such portion, a pivotal support for the toothed rack whereby the rack is carried in such manner that that end of it toward which the engaging portion of the loaded member advances always lies in the path of the engaging portion and such pivotal support moreover being disposed in such position that a line drawn from the point of engagement of the rack in the direction of thrust of the loaded member would pass to one side of the pivot and on such side as would cause the pressure of the engaging portion on the rack to rock the rack toward such engaging portion, and means for swinging the rack about the pivot so that that end nearest the engaging portion of the loaded member will be carried away from such portion a distance varying according to the amount to be registered, substantially as set forth.

5. In an item indicator for a cash register the combination of, a movable sign device, a loaded member that is operatively connected with the sign device and always tends to advance in a given path under the action of its loading, a toothed rack whose teeth lie approximately in the line of travel of a portion of this loaded member the teeth being engaged by such portion, a pivotal support for the toothed rack whereby the rack is carried in such manner that that end of it toward which the engaging portion of the loaded member advances always lies in the path of the engaging portion, means for swinging the rack about the pivotal support so that that end nearest the engaging portion of the loaded member will be carried away from such portion a distance varying according to the amount to be registered, yielding means that always tend to swing the rack upon its pivotal support and thus maintain it in engagement with the loaded member, and means for forcing the loaded member back against the action of its loading whereby all the parts return to their normal positions, substantially as set forth.

In testimony whereof I have signed my name to this specification in the presence of two subscribing witnesses.

ARTHUR JAMES POSTANS.

Witnesses:
 A. M. HAYWARD,
 HARRY B. BRIDGES.